United States Patent
Chen

(10) Patent No.: US 10,235,032 B2
(45) Date of Patent: Mar. 19, 2019

(54) METHOD FOR OPTIMIZING A CAPTURED PHOTO OR A RECORDED MULTI-MEDIA AND SYSTEM AND ELECTRIC DEVICE THEREFOR

(71) Applicant: HTC Corporation, Taoyuan (TW)

(72) Inventor: Shih-Jay Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 584 days.

(21) Appl. No.: 14/819,203

(22) Filed: Aug. 5, 2015

(65) Prior Publication Data
US 2017/0038949 A1   Feb. 9, 2017

(51) Int. Cl.
*H04N 1/60* (2006.01)
*G06T 11/60* (2006.01)
*G06F 3/0484* (2013.01)

(52) U.S. Cl.
CPC ...... *G06F 3/04847* (2013.01); *G06F 3/04845* (2013.01); *G06T 11/60* (2013.01); *H04N 1/60* (2013.01); *G06F 2203/04803* (2013.01); *G06T 2200/24* (2013.01)

(58) Field of Classification Search
CPC ............................ G06T 2200/24; H04N 1/60
See application file for complete search history.

(56) References Cited

U.S. PATENT DOCUMENTS

| | | | | |
|---|---|---|---|---|
| 5,898,436 A * | 4/1999 | Stewart | ............... | G06F 3/04845 345/594 |
| 6,166,719 A * | 12/2000 | Cariffe | ................ | G06F 3/04845 345/3.1 |
| 6,333,752 B1 * | 12/2001 | Hasegawa | ........... | G06F 3/04845 345/581 |
| 6,529,617 B1 * | 3/2003 | Prokoski | .............. | A61B 5/1176 382/128 |
| 7,024,677 B1 * | 4/2006 | Snyder | ................. | G11B 27/031 715/723 |
| 7,046,257 B2 * | 5/2006 | Ochiai | ............... | H04N 5/44591 345/560 |
| 7,082,227 B1 * | 7/2006 | Baum | .................. | G03D 15/005 348/231.6 |
| 7,593,603 B1 * | 9/2009 | Wilensky | .................. | G06T 5/00 358/1.2 |
| 8,214,766 B1 * | 7/2012 | Berger | ................ | G06F 3/04845 715/822 |
| 8,285,085 B2 * | 10/2012 | Manico | .............. | G06Q 30/0601 382/100 |

(Continued)

FOREIGN PATENT DOCUMENTS

| | | |
|---|---|---|
| CN | 101562699 A | 10/2009 |
| CN | 104079835 A | 10/2014 |
| TW | I357768 B | 2/2012 |

*Primary Examiner* — William L Bashore
*Assistant Examiner* — Nathan K Shrewsbury
(74) *Attorney, Agent, or Firm* — Birch, Stewart, Kolasch & Birch, LLP

(57) ABSTRACT

A method for optimizing a captured photo is provided. In step (a), an original photo is provided. In step (b), the original photo is adjusted according to two sets of parameters to generate two test photos. In step (c), the two test photos are shown on a display of an electric device for selection. In step (d), a user's preference is generated accordingly. In step (e), the captured photo is adjusted according to the user's preference.

22 Claims, 5 Drawing Sheets

(56) References Cited

U.S. PATENT DOCUMENTS

| | | | |
|---|---|---|---|
| 8,832,100 B2* | 9/2014 | Ramer | G06F 17/30867 |
| | | | 707/734 |
| 9,055,209 B2* | 6/2015 | Shin | H04N 5/232 |
| 9,256,919 B2* | 2/2016 | Livingston | G06T 3/40 |
| 9,363,419 B2* | 6/2016 | Wu | G06F 17/30247 |
| 9,563,336 B2* | 2/2017 | Barak | G06F 9/451 |
| 2001/0006425 A1* | 7/2001 | Takamori | H04N 1/40 |
| | | | 358/530 |
| 2002/0149678 A1* | 10/2002 | Shiki | G03D 15/001 |
| | | | 348/207.2 |
| 2004/0004626 A1* | 1/2004 | Ida | G06T 11/60 |
| | | | 345/626 |
| 2005/0264693 A1* | 12/2005 | Kondo | H04N 21/485 |
| | | | 348/458 |
| 2006/0155398 A1* | 7/2006 | Hoffberg | G05B 15/02 |
| | | | 700/86 |
| 2008/0309777 A1 | 12/2008 | Aoyama | |
| 2009/0303341 A1* | 12/2009 | Mikawa | H04N 1/6027 |
| | | | 348/222.1 |
| 2009/0319897 A1* | 12/2009 | Kotler | G06F 3/04845 |
| | | | 715/711 |
| 2011/0128410 A1* | 6/2011 | Lee | H04N 5/772 |
| | | | 348/231.99 |
| 2014/0089824 A1* | 3/2014 | George | G06F 8/38 |
| | | | 715/762 |
| 2014/0096037 A1* | 4/2014 | Grosz | G06F 3/0484 |
| | | | 715/753 |

* cited by examiner

| User's Preference | | | | | | |
|---|---|---|---|---|---|---|
| | Color | Sharpness | Brightness | Satuation | Contrast | HDR |
| User A | | +2 | | | | |

| Basic Information | | | User's Preference | | | | | |
|---|---|---|---|---|---|---|---|---|
| Account | Sensor | Lens | Color | Sharpness | Brightness | Satuation | Contrast | HDR |
| User A | | | | +2 | | | | |

METHOD FOR OPTIMIZING A CAPTURED PHOTO OR A RECORDED MULTI-MEDIA AND SYSTEM AND ELECTRIC DEVICE THEREFOR

TECHNICAL FIELD

The disclosure relates in general to a method for optimizing a captured photo or a recorded multi-media and a system and an electric device therefor, and more particularly to a method for optimizing a captured photo or a recorded multi-media and a system and an electric device therefor based on user's preference.

BACKGROUND

Mobile device, such as smart phone, has become indispensable to modern people in their everyday life. The smart phone has the function of taking photos and some smart phones further provide the function of modifying the photos with different configuration and settings. For example, if the photo is a photo of portrait, the photo will be modified by beatifying the skin color. If the photo has the image of sky, the color of the sky will be modified to be bluer.

However, the ways of modifying the photos with predetermined configuration and settings in the smart phone may not meet the requirement of all users. If the user wants to modify the photo in some particular way, he has to use the computer to modify the photo. For example, the user may adjust the color of the photo, the contract of the photo, or the brightness of the photo by himself with the assistance of software, such as Photoshop. It is very time consuming, and actually most of the users have no idea about how to modify the photo. Besides, a computer is often needed to modify the photo in this way. Therefore, how to provide an easy and convenient way to modify the photo to meet the preference of the user becomes a prominent task for the industries.

SUMMARY

The disclosure is directed to a method for optimizing a captured photo or a recorded multi-media and a system and an electric device therefor. The use's preference can be generated after asking the user to pick the test photo or the test multi-media he desires for at least one times. Then, the captured photo or the recorded multi-media is modified based on the user's preference. This disclosure provides an easy and convenient way to optimize the captured photo or the recorded multi-media to meet the preference of the user.

According to one embodiment, a method for optimizing a captured photo is provided. The method includes following steps. In step (a), an original photo is provided. In step (b), the original photo is adjusted according to two sets of parameters to generate two test photos. In step (c), the two test photos are shown on a display of an electric device for selection. In step (d), a user's preference is generated according to the selected test photo. In step (e), the captured photo is adjusted according to the user's preference.

According to another embodiment, a system for optimizing a captured photo is provided. The system includes a first device and a second device. The first device provides an original photo. The second device includes a display. The first device and the second device perform a procedure which includes adjusting the original photo according to two sets of parameters to generate two test photos by the first device, showing the two test photos on the display of the second device for selection, and generating a user's preference according to the selected test photo by the first device. The first device adjusts the captured photo according to user's preference.

According to an alternate embodiment, an electrical device is provided. The electrical device includes a control unit and a display, which is electrically connected to the control unit and controlled by the control unit. An original photo is provided, and a procedure is performed with the electrical device. The procedure includes adjusting the original photo according to two sets of parameters to generate two test photos, showing the two test photos on the display for selection, and generating a user's preference according to the selected test photo. The captured photo is adjusted according to user's preference.

According to an alternate embodiment, a method for optimizing a recorded multi-media is provided. The method includes following steps. In step (a), an original multi-media is provided. In step (b), the original multi-media is adjusted according to two sets of parameters to generate two test multi-media. In step (c), the two test multi-media is played on an electric device for selection. In step (d), a user's preference is generated according to the selected test multi-media. In step (e), the recorded multi-media is adjusted according to the user's preference.

The above and other aspects of the invention will become better understood with regard to the following detailed description of the preferred but non-limiting embodiment (s). The following description is made with reference to the accompanying drawings.

DETAILED DESCRIPTION

Figure 1:
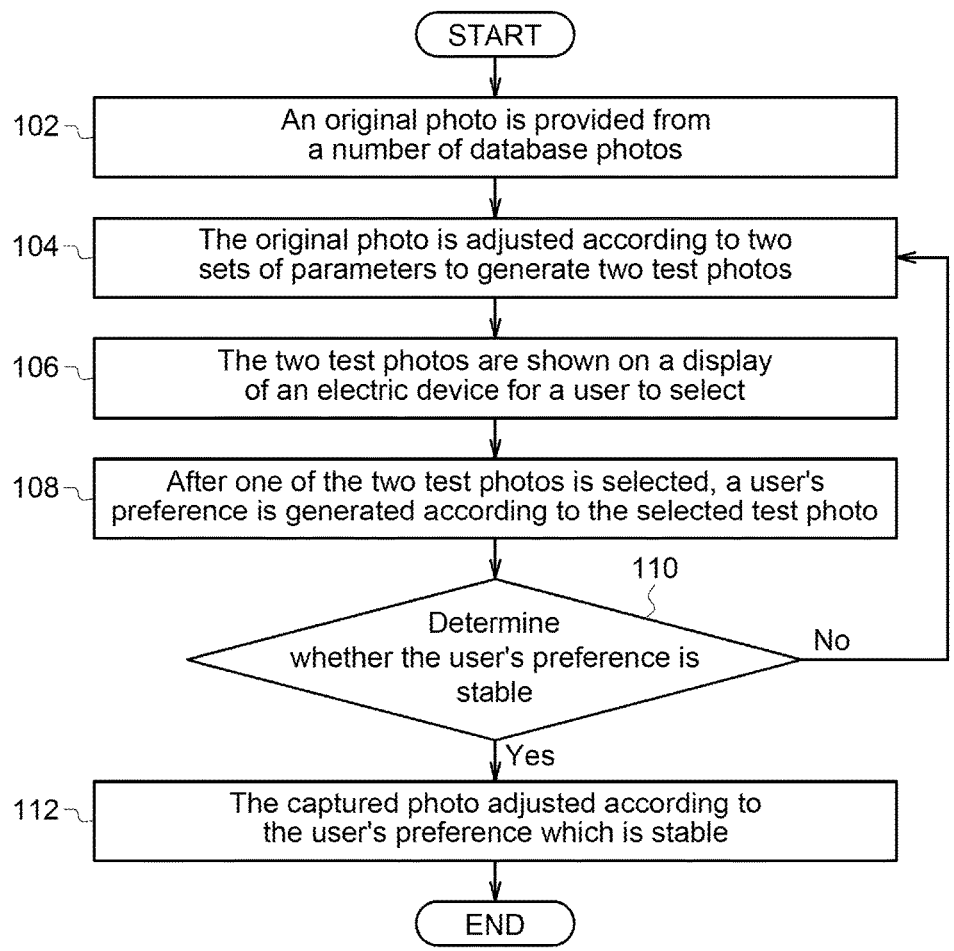
FIG. 1 is a flowchart of a method for optimizing a captured photo according to an embodiment of the disclosure is shown.

Referring to FIG. 1, a flowchart of a method for optimizing a captured photo according to an embodiment of the disclosure is shown. The method includes following steps. In step 102, an original photo is provided from a number of database photos. After that, in step 104, the original photo is adjusted according to two sets of parameters to generate two test photos. Then, in step 106, the two test photos are shown on a display of an electric device for a user to select. In step 108, after one of the two test photos is selected, a user's preference is generated according to the selected test photo. In step 110, whether the user's preference is stable is determined. When the user's preference is not stable, the two sets of parameters is updated according to the user's preference and steps 104 to 110 are repeated with the updated two sets of parameters until the user's preference is stable.

Then, in step 112, the captured photo adjusted according to the user's preference which is stable. In other embodiment, multi-media can be chosen to replace the photo in the step 102. For example, an original multi-media is also provided from a multi-media database and then operations of the steps 104~112 are followed as the method for optimizing the captured photo shown in FIG. 1.

Figure 2:
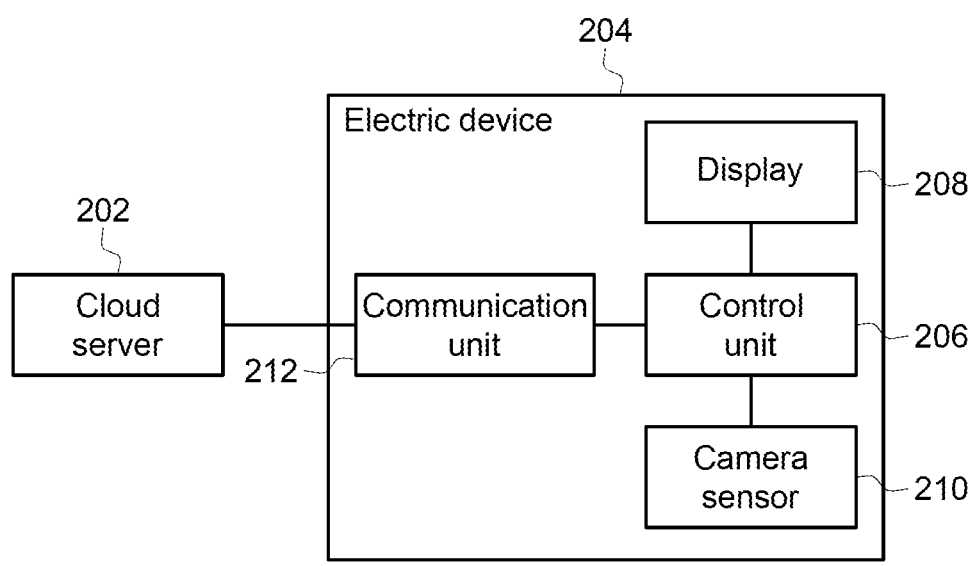
FIG. 2 shows a system which can perform the method for optimizing a captured photo according to the embodiment of the disclosure.
Figure 3:
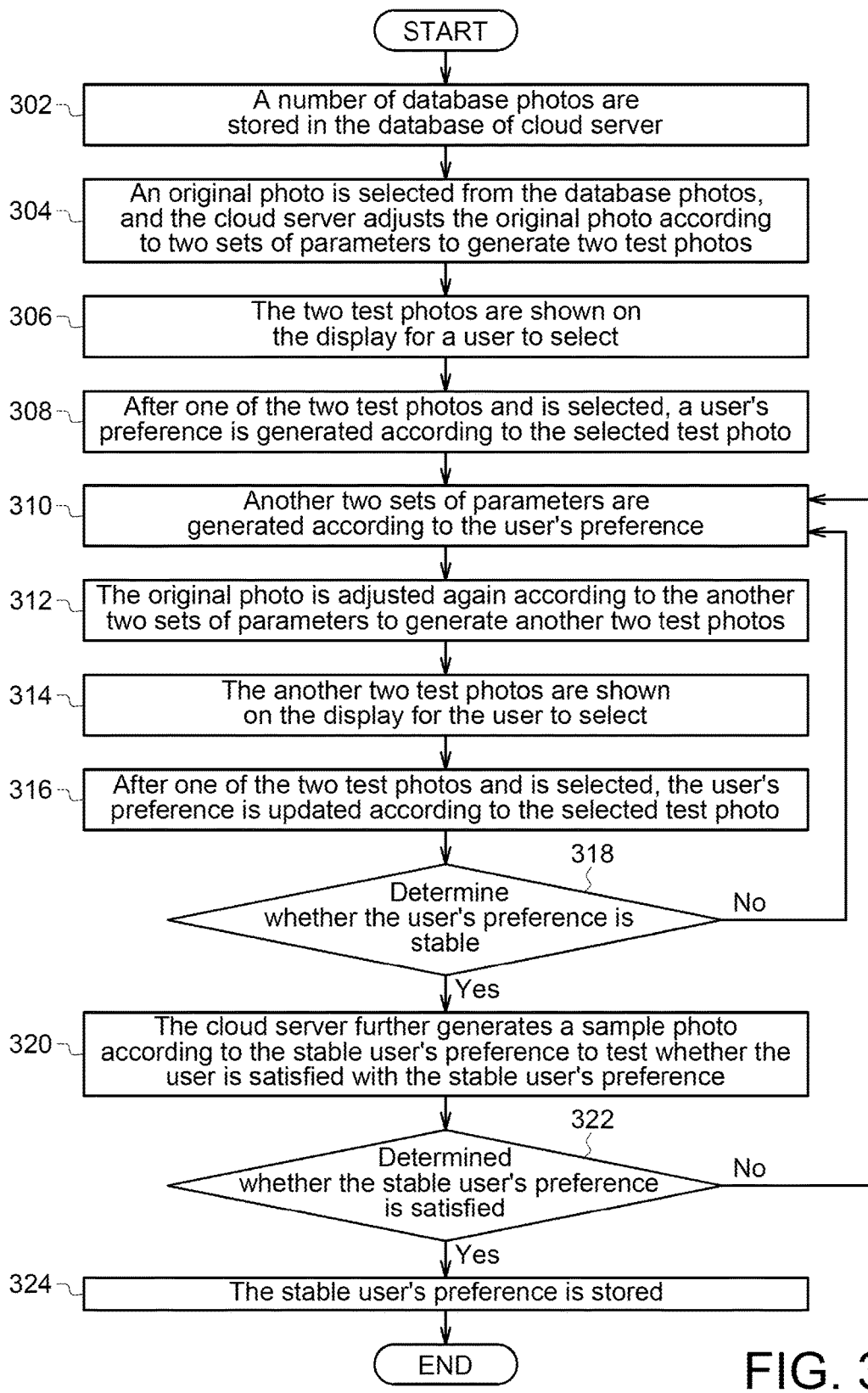
FIG. 3 shows an example of the process for generating the user's preference.
Figure 4:
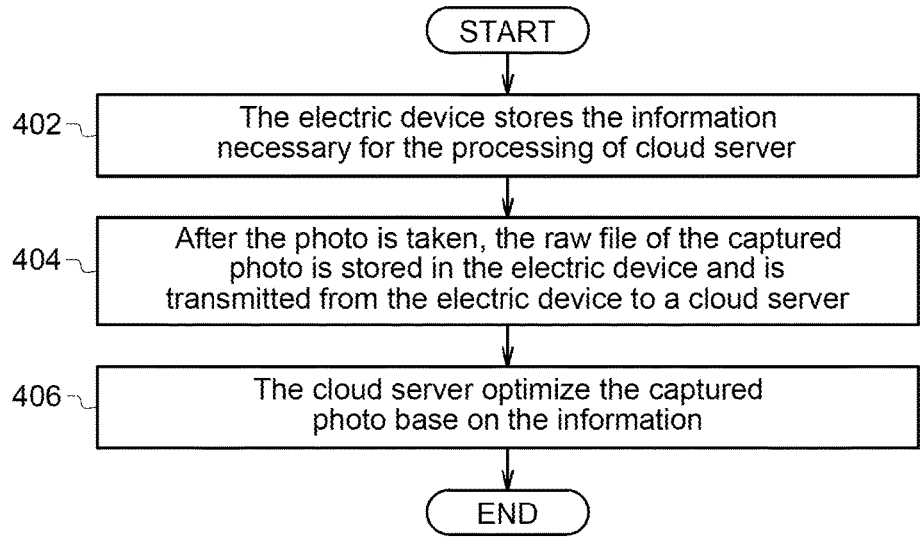
FIG. 4 shows an example of the process for adjusting the photo with the user's preference.

The method for optimizing a captured photo according to the embodiment of the disclosure can be performed by the system illustrated in FIG. 2, while the flowcharts in FIG. 3 and FIG. 4 shows an example for the method for optimizing a captured photo performed by the system in FIG. 2 according to the embodiment of the disclosure. The flowchart in FIG. 3 shows the process for generating the user's preference, and the flowchart in FIG. 4 shows the process for adjusting the photo with the user's preference.

As shown in FIG. 2, the system for optimizing a captured photo includes a first device and a second device. For example, the first device is a cloud server 202 and the second device is an electric device 204. The electrical device 204 includes, for example, a control unit 206, a display 208, and a camera sensor 210. The display 208 is electrically connected to the control unit 206 and is controlled by the control unit 206. The camera sensor 210 is electrically connected to the control unit 206 and is controlled by the control unit 206. The camera sensor 210 is used for capturing a photo. The electrical device 204 can further include a communication unit 212 for communicating with the cloud server 202.

In step 302, a number of database photos, for example, several thousands of database photos, are stored in the database of the cloud server 202. These database photos include photos of a number of categories, for example, the photos of portrait, the photos of blue sky, the photos of trees, and the photos of sunset. After that, in step 304, an original photo is selected from the database photos, and the cloud server 202 adjusts the original photo according to two sets of parameters to generate two test photos. Then, in step 306, the two test photos are shown on the display 208 for a user to select.

Each set of parameters includes at least one parameter, That is, each set of parameters may include one parameter, two parameters, or more than two parameters. The parameter may be a parameter of color, a parameter of sharpness, a parameter of brightness, a parameter of saturation, a parameter of contrast, and a parameter of high dynamic range (HDR). For example, a set of parameter may only have one parameter, which is anyone of the parameter of color, sharpness, brightness, saturation, contrast, and high dynamic range. Alternatively, a set of parameter may have more than one parameters, which are selected from the parameters of color, sharpness, brightness, saturation, contrast, and high dynamic range. That is, the set of parameter may include the parameters of color and sharpness, or the parameters of sharpness, brightness, saturation, contrast, and high dynamic range.

Figure 5:
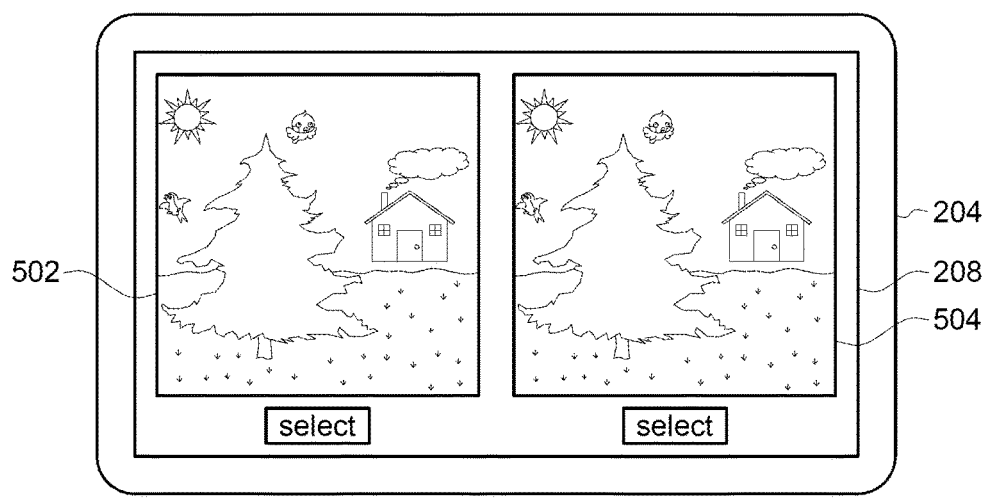
FIG. 5 illustrates the example of two test photos shown in the display of the electronic device.

Take the set of parameter includes the parameter of sharpness for example. Two test photos 502 and 504 may be generated by adjusting the original photo with increasing the value of the parameter of sharpness by 1 and 2, respectively. Referring to FIG. 5, the example of two test photos 502 and 504 shown in the display 208 of the electronic device 204 is illustrated. The user can select one of the test photos 502 and 504 which he desires.

In step 308, after one of the two test photos 502 and 504 is selected, a user's preference is generated according to the selected test photo. Assume the test photo 504, corresponding to the parameter of sharpness increased by 2, is selected.

Figures 6, 7, 8:
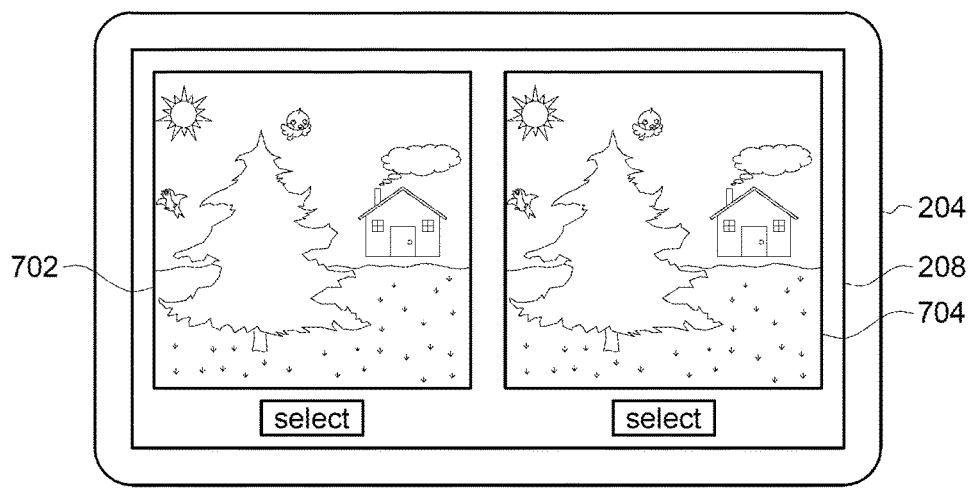
FIG. 6 shows an example for the user's preference.
FIG. 7 illustrates another two test photos shown in the display of the electronic device.
FIG. 8 shows an example of data structure for the user account recorded in the cloud server.

Then, the user's preference will be set as the parameter of sharpness increased by 2, as shown in FIG. 6, which is an example for the user's preference.

After that, in step 310, another two sets of parameters are generated according to the user's preference. For example, another two sets of parameters of sharpness increased by 2 and 4 are generated. Then, in step 312, the original photo is adjusted again according to the another two sets of parameters to generate another two test photos. In step 314, the another two test photos are shown on the display 208 for the user to select. The another two test photos are, for example, the two test photos 702 and 704 shown in the display 208 of the electronic device 204 in FIG. 7. The test photos 702 is corresponding to the parameters of sharpness increased by 2 and the test photos 704 is corresponding to the parameters of sharpness increased by 4.

Then, step 316 is entered. After one of the two test photos 702 and 704 is selected, the user's preference is updated according to the selected test photo which is selected from the two test photos 702 and 704.

In step 318, whether the user's preference is stable is determined. When the user's preference is not stable, steps 310 to 316 are repeated till the user's preference is stable. After repeating steps 310 to 316, when the values of the two sets of parameters are maintained at substantially the same value, it can be deemed that the user's preference is stable. For example, assume the test photo corresponding to the parameter of sharpness increased by 2 is continuously selected in the following several round of performing steps 310 to 316, it can be deemed that the user's preference is stable in corresponding to the parameter of sharpness increased by 2. If not, it can be deemed that the user's preference is not stable.

In step 320, the cloud server 202 further generates a sample photo according to the stable user's preference to test whether the user is satisfied with the stable user's preference. Next, in step 322, it is determined that whether the stable user's preference is satisfied. When the stable user's preference is satisfied, step 324 is performed that the stable user's preference is stored in at least one of the cloud server 202 and the electric device 204. When the stable user's preference is not satisfied, the cloud server 202 repeats steps 310 to 322 till the user's preference is satisfied.

In some embodiment, after it is determined that the user's preference is not stable in step 318, another original photo can be selected from the database photos, and step 310 to 316 can be repeated with the another original photo to update the user's preference. Furthermore, the another original photo can be selected from the database photos in different category. For example, the first original photo can be selected from the category of portrait photo, and the second original photo can be selected from the category of blue sky photo. In some embodiment, the user's preference can includes the user's preference corresponding to different categories of photos.

After the user's preference is stable, the photos can be adjusted according to the user's preference which is stable. FIG. 4 shows an example for the process of adjusting the photo with the user's preference. In step 402, the electric device 204 stores the information necessary for the processing of cloud server 202. The information includes the user's preference. In some embodiment, the information can further include some basic information, for example, the type of the electric device 204 and/or the type of camera sensor 210 and/or the type of the lens of the electric device 204.

After that, in step 404, after the photo is taken, the raw file of the captured photo is stored in the electric device 204 and is transmitted from the electric device 204 to a cloud server 202. Then, in step 406, the cloud server 202 will optimize the captured photo base on the information. That is, the cloud server 202 can optimize the captured photo base on the user's preference generated by the process in FIG. 3. Or, the cloud server 202 can optimize the captured photo base on the user's preference generated above and the type of the electric device 204 and/or the type of camera sensor 210 and/or the type of the lens of the electric device 204.

The type of the electric device 204 and/or the type of camera sensor 210 and/or the type of the lens of the electric device 204 can be transmitted from the electric device 204 to the cloud server 202 with the captured photo, or the type of the electric device 204 and/or the type of camera sensor 210 and/or the type of the lens of the electric device 204 can be previously stored in the cloud server 202 with an user account. Referring to FIG. 8, an example of data structure for the user account recorded in the cloud server 202 is shown.

The electric device 204 can be a mobile phone, a smart phone or a Tablet PC. The user's preference can be updated whenever the user wants. When the user uses another electric device to take the picture, the user can still login in to the cloud server 202 and use the user's preference stored in the cloud server 202 to optimize the captured photo taken by the another electric device. The above process performed by the cloud server 202 can also be performed by the electric device 204.

In some embodiment, a method for optimizing a recorded multi-media is provided. The method includes the following steps. First, an original multi-media is provided. Then, the original multi-media is adjusted according to two sets of parameters to generate two test multi-media. After that, the two test multi-media is played on an electric device for selection. Then, a user's preference according to the selected test multi-media is generated. After that, the recorded multi-media is adjusted according to the user's preference. In some embodiment, the multi-media described above, for example, includes music.

Each set of parameters for multi-media includes at least one parameter, each parameter includes one of a parameter of color, a parameter of sharpness, a parameter of brightness, a parameter of saturation, a parameter of contrast, and a parameter of high dynamic range (HDR). Each parameter for music or for audio, for example, includes the gains for different frequency bands.

In the process of the embodiment, the user only have to choose the test photos or the test multi-media he desires, then the user's preference can be generated accordingly. The user's preference can meet individual's requirement for optimizing the captured photo or for optimizing the recorded multi-media. The user does not have to use a computer to modify the captured photo or the recorded multi-media. An easy and convenient way to optimize the captured photo or the recorded multi-media is provided in the disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for optimizing a captured photo, comprising:
    (a) providing an original photo;
    (b) adjusting the original photo according to two sets of parameters to generate two test photos;
    (c) showing the two test photos on a display of an electric device for selection;
    (d) generating a user's preference according to the set of parameters of the selected test photo;
    (e) providing another two sets of parameters according to the user's preference;
    (f) adjusting the original photo according to the another two sets of parameters;
    (g) showing the another two test photos on the display of the electric device for selection;
    (h) updating the user's preference according to the another set of parameters of the another selected test photo;
    (i) determining whether the sets of parameters of previously and currently selected test photos are maintained at substantially the same value;
    (j) when the sets of parameters of previously and currently selected test photos are maintained at substantially the same value, determining that the user's preference is stable;
    (k) when the sets of parameters of previously and currently selected test photos are not maintained at substantially the same value, determining that the user's preference is not stable;
    (l) repeating the steps of (e)-(k) until the user's preference is determined to be stable; and
    (m) adjusting the captured photo according to the stable user's preference.

2. The method according to claim 1, wherein each set of parameters comprising at least one parameter, each parameter comprises one of a parameter of color, a parameter of sharpness, a parameter of brightness, a parameter of saturation, a parameter of contrast, and a parameter of high dynamic range (HDR).

3. The method according to claim 1, wherein after step (l) and before step (m), the method further comprises: (11) generating a sample photo according to the stable user's preference to test whether the stable user's preference is satisfied; (12) when the stable user's preference is satisfied, storing the stable user's preference; and (13) when the stable user's preference is not satisfied, updating the two sets of parameters according to the user's preference and repeating steps (b) to (l), (11) to (13) until the user's preference is satisfied.

4. The method according to claim 1, wherein the user's preference is stored in at least one of a cloud server and the electric device, and in the step of (l), another original photo is selected from a plurality of database photos, and step (b) to (l) are repeated with the another original photo.

5. The method according to claim 1, wherein in the step (m), the captured photo is captured by the electric device and the captured photo is adjusted further according to the type of the electric device.

6. The method according to claim 1, wherein in the step (m), the captured photo is captured by the electric device, the captured photo is transmitted from the electric device to a cloud server, and the captured photo is adjusted by the cloud server.

7. A system for optimizing a captured photo, comprising:
    a cloud server, for providing an original photo and adjusting the original photo according to two sets of parameters to generate two test photos; and
    an electric device, comprising a display for showing the two test photos for selection;
    wherein the cloud server generates a user's preference according to the set of parameters of the selected test photo;

wherein the cloud server performs a procedure which comprises:
    providing another two sets of parameters according to the user's preference;
    adjusting the original photo according to the another two sets of parameters;
    showing the another two test photos on the display of the electric device for selection;
    updating the user's preference according to the another set of parameters of the another selected test photo;
    determining whether the sets of parameters of previously and currently selected test photos are maintained at substantially the same value;
    when the sets of parameters of previously and currently selected test photos are maintained at substantially the same value, determining that the user's preference is stable; and
    when the sets of parameters of previously and currently selected test photos are not maintained at substantially the same value, determining that the user's preference is not stable;
    wherein the procedure is performed repeatedly by the cloud server until the user's preference is determined to be stable;
    wherein the cloud server adjusts the captured photo according to stable user's preference.

8. The system according to claim 7, wherein the cloud server is implemented by a cloud server and the electric device is implemented by an electric device.

9. The system according to claim 7, wherein the cloud server and the electric device are both implemented by an electric device.

10. The system according to claim 7, wherein each set of parameters comprising at least one parameter, each parameter comprises one of a parameter of color, a parameter of sharpness, a parameter of brightness, a parameter of saturation, a parameter of contrast, and a parameter of high dynamic range.

11. The system according to claim 7, wherein after the user's preference is stable and before the captured photo is adjusted, the cloud server further generates a sample photo according to the stable user's preference to test whether the stable user's preference is satisfied;
    wherein when the stable user's preference is satisfied, the stable user's preference is stored in at least one of the cloud server and the electric device;
    wherein when the stable user's preference is not satisfied, the procedure is performed repeatedly till the user's preference is satisfied.

12. The system according to claim 7, wherein when the procedure is repeated, the repeated procedure is performed with another original photo-selected from a plurality of database photos.

13. The system according to claim 7, wherein the captured photo is captured by the electric device and the captured photo is adjusted further according to the type of the electric device.

14. The system according to claim 7, wherein the captured photo is captured by the electric device, the captured photo is transmitted from the electric device to the cloud server, and the captured photo is adjusted by the cloud server.

15. An electrical device, comprising:
    a display; and
    a processor containing at least one of unit, including:
    a control unit;
    wherein the display electrically connected to the control unit and controlled by the control unit;
    wherein an original photo is provided and adjusted according to two sets of parameters to generate two test photos, the display shows the two test photos for selection, and a user's preference is generated according to the set of parameters of the selected test photo;
    wherein a procedure is performed with the electrical device and comprises:
        providing another two sets of parameters according to the user's preference;
        adjusting the original photo according to the another two sets of parameters;
        showing the another two test photos on the display of the electric device for selection;
        updating the user's preference according to the another set of parameters of the another selected test photo;
        determining whether the sets of parameters of previously and currently selected test photos are maintained at substantially the same value;
        when the sets of parameters of previously and currently selected test photos are maintained at substantially the same value, determining that the user's preference is stable; and
        when the sets of parameters of previously and currently selected test photos are not maintained at substantially the same value, determining that the user's preference is not stable;
    wherein the procedure is performed with the electrical device repeatedly until the user's preference is determined to be stable;
    wherein the captured photo is adjusted according to stable user's preference;
    wherein the control unit is operated under the control of the processor.

16. The electrical device according to claim 15, wherein each set of parameters comprising at least one parameter, each parameter comprises one of a parameter of color, a parameter of sharpness, a parameter of brightness, a parameter of saturation, a parameter of contrast, and a parameter of high dynamic range.

17. The electrical device according to claim 15, wherein after the user's preference is stable and before the captured photo is adjusted, a sample photo is generated according to the stable user's preference to test whether the stable user's preference is satisfied;
    wherein when the stable user's preference is satisfied, the stable user's preference is stored;
    wherein when the stable user's preference is not satisfied, the procedure is performed repeatedly till the user's preference is satisfied.

18. The electric device according to claim 15, wherein the captured photo is adjusted further according to the type of the electric device.

19. The electric device according to claim 15, wherein when the procedure is repeated, the repeated procedure is performed with another original photo selected from a plurality of database photos.

20. The electric device according to claim 15, wherein the electric device further comprises a camera sensor, electrically connected to the control unit and controlled by the control unit, the captured photo is captured by the camera sensor, and the procedure is performed by a cloud server after the captured photo is transmitted to the cloud server except showing the two test photos on the display for selection.

21. A method for optimizing a recorded multi-media, comprising:
(a) providing an original multi-media;
(b) adjusting the original multi-media according to two sets of parameters to generate two test multi-media;
(c) playing the two test multi-media on an electric device for selection;
(d) generating a user's preference according to the set of parameters of the selected test multi-media;
(e) providing another two sets of parameters according to the user's preference;
(f) adjusting the original multi-media according to the another two sets of parameters;
(g) showing the another two test multi-media on the display of the electric device for selection;
(h) updating the user's preference according to the another set of parameters of the another selected test photo;
(i) determining whether the sets of parameters of previously and currently selected test multi-media are maintained at substantially the same value;
(j) when the sets of parameters of previously and currently selected test multi-media are maintained at substantially the same value, determining that the user's preference is stable;
(k) when the sets of parameters of previously and currently selected test multi-media are not maintained at substantially the same value, determining that the user's preference is not stable;
(l) repeating the steps of (e)-(k) until the user's preference is determined to be stable; and
(m) adjusting the recorded multi-media according to stable the user's preference.

22. The method according to claim 21, wherein the multi-media comprises music.

* * * * *